United States Patent
Flanagan

(10) Patent No.: US 6,708,420 B1
(45) Date of Patent: Mar. 23, 2004

(54) PIEZOELECTRIC TOUCH PROBE

(76) Inventor: Patrick M. Flanagan, 21887 Woodfield Trail, Strongsville, OH (US) 44136

( * ) Notice: Subject to any disclaimer, the term of this patent is extended or adjusted under 35 U.S.C. 154(b) by 0 days.

(21) Appl. No.: 09/226,454

(22) Filed: Jan. 6, 1999

(51) Int. Cl.[7] ................................................. G01B 3/00
(52) U.S. Cl. ........................ 33/556; 333/558; 333/559; 333/561
(58) Field of Search ........................ 33/556, 558, 559, 33/561

(56) References Cited

U.S. PATENT DOCUMENTS

| | | | |
|---|---|---|---|
| 4,397,188 A | * | 8/1983 | Bansevichus et al. .......... 33/561 |
| 4,769,919 A | * | 9/1988 | Lloyd et al. .................. 33/561 |
| 5,209,131 A | * | 5/1993 | Baxter ......................... 33/559 |
| 5,247,751 A | | 9/1993 | Obya et al. .................... 33/561 |
| 5,517,124 A | * | 5/1996 | Rhoades et al. .............. 33/503 |
| 5,524,354 A | | 6/1996 | Bartzke et al. ................ 33/561 |
| 5,526,576 A | * | 6/1996 | Fuchs et al. .................. 33/556 |
| 5,917,181 A | * | 6/1999 | Yoshizumi et al. ........... 33/561 |
| 6,044,569 A | * | 4/2000 | Ogihara et al. ............... 33/556 |

* cited by examiner

*Primary Examiner*—Randy W. Gibson
(74) *Attorney, Agent, or Firm*—McHale & Slavin

(57) ABSTRACT

The instant invention is a dynamic piezoelectric touch probe for use with coordinate measurement machines. The touch probe is characterized by five subsystems; (1) piezoelectric vibrator controlled by a self-tuning drive circuit that adjusts operating frequency and amplitude, (2) a high sensitivity, resonant accelerometer unit coupled to the piezoelectric vibrator, (3) a flexible suspension/stylus with transverse resonant frequencies tuned to the operating frequency band of the piezoelectric vibrator, (4) a digital control circuit that automatically sweeps the operating band of the piezoelectric vibrator to (a) detect the resonant frequency of the stylus/suspension, (b) set the drive signal frequency at the resonance of the stylus/suspension and (c) control the drive signal amplitude, and (5) a triaxial load cell system that is useful for detecting excessive low frequency suspension/stylus vibration, and excessive impact force during a touch event.

19 Claims, 9 Drawing Sheets

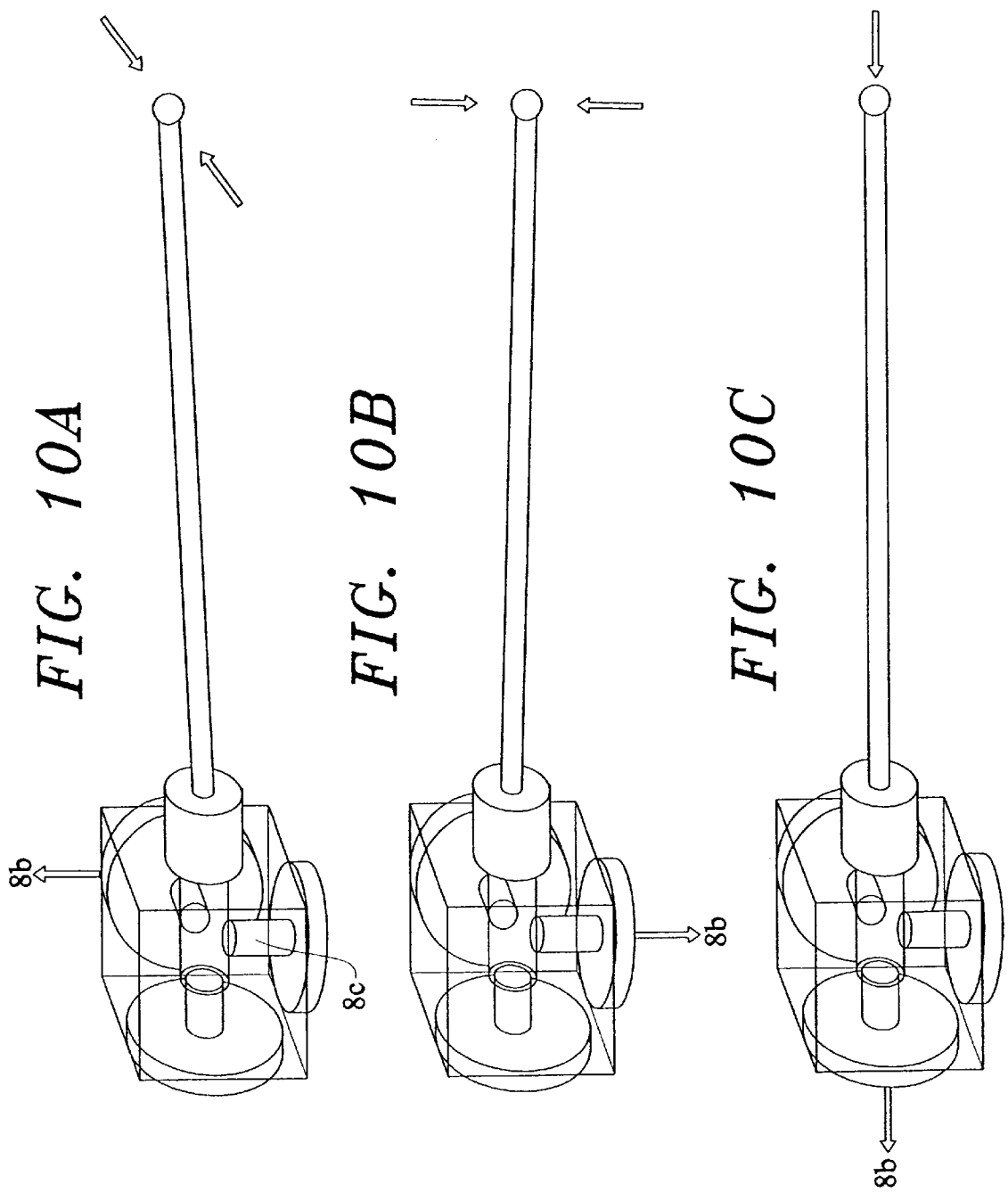

PIEZOELECTRIC TOUCH PROBE

FIELD OF THE INVENTION

This invention relates to touch probes useful in conjunction with coordinate measurement machines and particularly relates to piezoelectric touch probes.

BACKGROUND OF THE INVENTION

Touch probes are used by Coordinate Measurement Machines (CMM) to measure the geometry of structures. A typical multi-degree of freedom CMM consists of three hardware components:

1) a robotic arm;
2) a motorized probe head; and
3) a touch probe.

The robotic arm moves the probe head along the X, Y and Z axis. The motorized probe head rotates the touch probe in the vertical and horizontal planes. The use of a motorized probe head thus transforms a 3-axis CMM into a machine having 5 degrees of freedom. A workpiece with complex geometry including holes and cavities requires this capability. Utilizing position feedback and the touch sensitive probe, a CMM works by either tracing or interval touching a workpiece. Data collected by a CMM are used by engineers and manufacturers to document and qualify part geometry. A state-of-the-art CMM can be calibrated to a degree of accuracy of less than 0.0002 inches (0.2 mils). Highly sophisticated computer systems are utilized to automate the entire measurement process including programming the approach path of the probe's ruby tip stylus, adjusting probe speed and data collection and analysis.

Most commercially available touch probes operate by measuring a change in position, pressure and/or force produced when a ruby-tipped stylus makes contact with a test structure. When the stylus feels the surface of the test structure, the minute force of contact between the stylus and workpiece activates a switch or pressure/force sensor to trigger the CMM. The utilization of changes in position, pressure and/or force as the triggering event thus limits the prior art touch probes to relatively low measurement speeds. If used at higher operating speeds, the prior art probes will produce a false trigger due to the seismic effect of the ruby-tipped stylus. In an effort to minimize this problem, prior art touch probes have provided a means to adjust the trigger force level. Touch probes that trigger due to stylus position also have adjustable springs to increase or decrease the contact force needed to deflect the stylus thereby causing it to trigger. If sufficient contact force is produced between the stylus and the workpiece the touch probe will trigger the CMM to stop and collect position data. In the case of rigid elastic parts, the level of contact force required to trigger a measurement is usually sufficiently low so that CMM accuracy can be maintained. However, even when the lowest trigger force settings are utilized, test structures that are flexible, fragile and/or soft will deflect or even break prior to the touch probe triggering a measurement. Although this condition does not affect the measured precision of test data, since trigger levels are repeatable, it will nevertheless generate inaccurate geometric data. For example, workpiece deflections of from 0.001 to 0.015 inches have occurred prior to the touch probe triggering. This deflection often exceeds the 0.0002 inch accuracy to which the machine is calibrated. Additionally, if used with brittle ceramic and fragile glass parts, breakage will occur due to the touch force required to trigger the CMM to stop. Under such conditions, the CMM operator can not determine the accuracy of measured part data by conducting repeatability tests since trigger levels are consistent. While the repeatability of prior art measurements is quite high, the accuracy of the data collected can often be quite low especially for flexible test structures.

Thus, if a touch probe could be provided which was (1) compatible with existing CMM systems, (2) useful for measuring both rigid and flexible parts, (3) operative at higher speeds without producing false triggers, and (4) capable of yielding results approaching the accuracy of the CMM calibration specification, a long felt need would be satisfied.

DESCRIPTION OF THE PRIOR ART

U.S. Pat. No. 5,247,751 to Ohya et al discloses a touch probe that comprises an ultrasonic vibrating horn having a piezoelectric element. This invention uses a RF (Radio Frequency) electrical signal to drive the piezoelectric element(s) which is sandwiched between electrodes and designed to vibrate at the mechanical natural frequency of the ultrasonic vibrating horn, and a feeler to be brought into contact with an object to be measured. The probe further comprises a touch detecting device for monitoring a current between said electrodes to detect a touch between the object to be measured and said feeler in accordance with a change in current value produces at the moment said feeler touches the object to be measured.

The vibrating horn consists of a stylus-like structure with a large-diameter base. The horns geometry is based on the quarter-wavelength equation for compression or longitudinal waves. By electrically driving the piezoelectric crystals at the quarter-wavelength frequency, a standing wave is produced in the stylus.

The patent to Ohya et al differs from the instant invention as follows:

1) The instant Piezoelectric Touch Probe (PTP) uses a piezoelectric driver to vibrate a high sensitivity accelerometer that is coupled to a stylus/suspension unit. Acceleration, not current, is used to detect contact conditions. Both the piezoelectric driver and accelerometer can be designed for high amplitude drive and resonant detection.

2) The stylus/suspension unit are flexible permitting significant deflection without taking on a permanent set. Stylus/suspension units are made from low modulus, high yield spring material. The stylus/suspension unit maintains the accuracy of CMM measurements by deflecting away from the part without causing bending of the part. The stylus/suspension unit is designed with a globe stiffness. This means that contact angle between a part and stylus does not significantly change interface stiffness.

3) The stylus/suspension unit vibrates using a transverse-mode and/or axial-mode of vibration at a high modal frequency (typically >=5th mode of transverse/axial vibration). This technique sensitizes the entire stylus shaft. Sensitizing the entire stylus shaft reduces shaft-out problems that occur when the CMM conducts a search for points that define the surface. Errors in measured points can result in shanking of the stylus during a measurement process. Shanking occurs when the stylus shaft, not the ruby tip, makes direct contact with the part. CMM software uses all data points including shank touches to locate the calibration points.

U.S. Pat. No. 5,524,354 to Bartzke et al and entitled "Probe Element for Coordinate Measurement System" utilizes an array of piezoelectric beams arranged in a polygonal configuration. The patent focuses on the geometry of the piezo-resonator element. This patent claims piezo resonators in the form of rod oscillators, tuning-fork oscillators, torsional oscillators, longitudinal oscillators, quarter-wave oscillators and plate-shaped oscillators. The tactile sensing of the micro-probe elements on the surface of the specimen is effected by measuring the change in the resonance characteristics of the piezo-resonators.

This patent does not resonate a piezoelectric element coupled to a structure, thus the stylus is comprised of the so-called piezo-resonator, or a plurality thereof. This patent does not use a vibration sensor to detect contact. Due to this design, the touch probe system depicted in the patent will be very stiff and very brittle. The stylus would not flex when making contact with a part, thus breakage or unacceptable error would likely occur. Additionally, breakage of either the probe or the workpiece may well occur at high impact (touch) speeds.

The instantly presented PTP does not use a change in vibration level of a resonant piezoelectric element or piezo-resonator to detect contact. The PTP of the instant invention uses a dynamically tuned structure that resonates the piezoelectric driver signal and is further amplified by a resonance design for the accelerometer. This approach amplifies the sensitivity and output signal level of the PTP. A high sensitivity and output signal level for the PTP is required to detect any minute change in mechanical impedance that occurs during contact along the stylus shaft or at the end.

SUMMARY OF THE INVENTION

The instant invention is directed to a dynamic probe that is sensitive to contact and consists of five subsystems:

(1) piezoelectric vibrator controlled by a self-tuning drive circuit that adjusts operating frequency and amplitude;

(2) a high sensitivity, resonant accelerometer unit coupled to the piezoelectric vibrator;

(3) a flexible suspension/stylus with transverse resonant frequencies tuned to the operating frequency band of the piezoelectric vibrator;

(4) a triaxial set of piezoelectric load cells to measure and detect; (a) suspension/stylus vibration and (b) suspension/stylus stress/force generated at contact with the workpiece; and (5) a digital control circuit that automatically sweeps the operating band of the piezoelectric vibrator to
   (a) detect the resonant frequency of the stylus/suspension,
   (b) set the drive signal frequency at the resonance of the stylus/suspension, and
   (c) control the drive signal amplitude.

The digital control circuit also measures the output signal from the high sensitivity resonant accelerometer and compares this signal to a reference level to determine a touch or no touch condition and produce a trigger signal.

The high sensitivity, resonant accelerometer assembly has two preferred embodiments. In the first embodiment, a dynamically tuned structure is provided to amplify driver vibration levels and fasten the stylus/suspension. This mechanism couples the piezoelectric driver to the high sensitivity, resonant accelerometer. In the second embodiment, the piezoelectric vibrator is directly coupled to a high sensitivity, resonant accelerometer having a low seismic mass. In this embodiment, the accelerometers seismic mass supports the stylus/suspension.

The digital control unit provides a means for periodic calibration of piezoelectric driver frequency and amplitude for resonance stylus/suspension dynamics.

A low frequency triaxial set of piezoelectric load cells couples the suspension/stylus to the CMM probe head. This sensor group measures the dynamic response of the stylus in contact with the test part. This measurement detects the presence of vibration and high suspension/stylus impact forces during CMM operation.

Thus, it is an objective of the instant invention to provide a touch probe which is compatible with existing CMM systems, is useful for measuring both rigid and flexible parts at high CMM operating speeds, and yields results approaching the accuracy of the CMM calibration specification.

It is a further objective of the instant invention to produce a piezoelectric touch probe which combines a piezoelectric driver which vibrates a high sensitivity accelerometer which is coupled to a stylus/suspension unit.

It is yet a further objective of the instant invention to teach the use of an acceleration signal to detect a contact condition.

It is a still further objective of the instant invention to teach a dynamically tuned structure to amplify the driver signal.

It is yet another objective of the instant invention to provide a resonant accelerometer designed to amplify the acceleration signal.

It is still another objective of the instant invention to teach a stylus/suspension design which is coupled to the dynamically tuned structure.

It is yet an additional objective of the instant invention to teach a flexible, low modulus, high yield strength ruby-tipped stylus/suspension with a significantly low stiffness such that contact force between the stylus and the part are minimized.

These and other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWING

FIG. 10 is a cross-sectional view that illustrates interaction between the triaxial load cell crystals and stylus in the "x", "y" and "z" axes;

DESCRIPTION OF THE PREFERRED EMBODIMENT(S)

Figure 1:
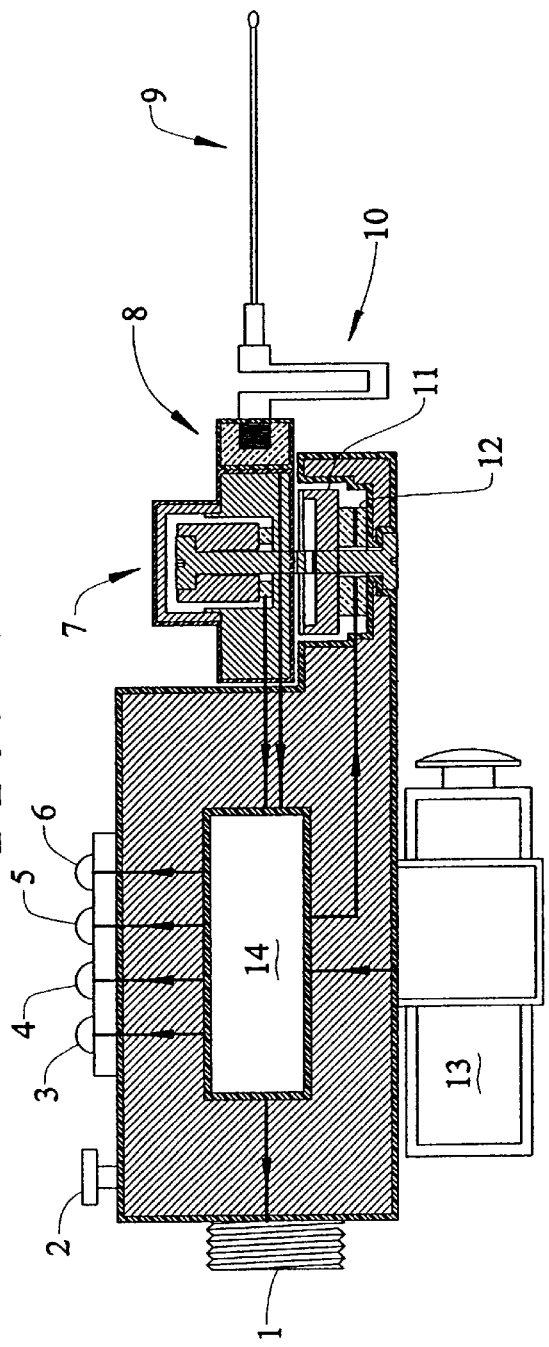
FIG. 1 is a cross-sectional view of the Piezoelectric Touch Probe assembly.

The Piezoelectric Touch Probe (PTP) of the present invention is a self-powered retrofit probe that is compatible with RENISHAW motorized probe heads. The mechanical and electrical interface for the PTP is a standard connection used to attach a RENISHAW touch probe to the motorized probe head. The invention will now be described with reference to the accompanying figures wherein like reference numerals indicate like parts.

With reference to FIG. 1, the Piezoelectric Touch Probe (PTP) consists of fourteen basic components. The threaded connector 1 couples the PTP to the RENISHAW motorized head either directly or through an extension/adaptor such as the RENISHAW autojoint, or the like. When detecting a touch event, the PTP produces a trigger signal to activate the RENISHAW control system and stop the CMM movement to collect position data. This trigger signal is similar, if not identical, to the output signal produced by RENISHAW touch probes.

The PTP is self-powered using a DC battery 13. The PTP's Data Acquisition and Control Unit 14 generates an electrical sinusoidal drive signal to excite the Driver Crystal 12. Driver Crystal 12 vibration is mechanically amplified by the Tuned Base 11. The vibration level of the Tuned Base 11 is measured by a Vibration Sensor (accelerometer) 7. The Data Acquisition and Control Unit 14 measures vibration signals from the Vibration Sensor. If the vibration signal is below a threshold level indicating a touch, the Data Acquisition and Control Unit 14 activates a trigger touch signal.

The Data Acquisition and Control Unit 14 operates four indicator lights. The four lights display:
[a] if PTP power is ON or OFF (Sleep Mode) 3;
[b] if the PTP needs battery replacement due to Low Battery power 4;
[c] if the PTP detects a high level of stylus Dynamics 5; and
[d] if the PTP detects a Touch 6(light blinks) or high stylus contact force (light stays on).

Figure 11:
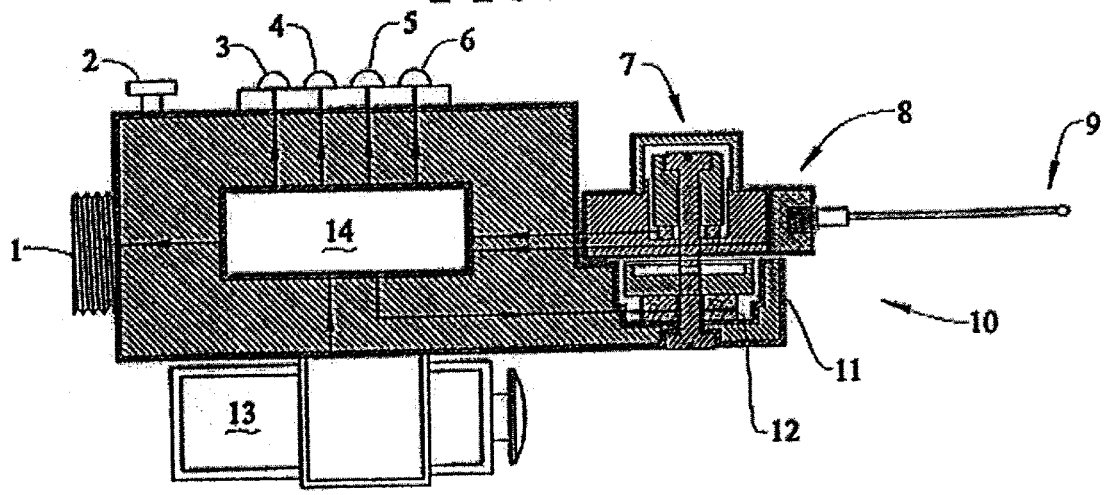
FIG. 11 is a cross-sectional view of the Piezoelertric Touch Probe assembly directly coupled to the vibration sensor.

The dynamic and quasi-static force signals are measured using a Dynamic Force Sensor 8. The Flexible Stylus 9 is either directly coupled to the Vibration Sensor 7 as is particularly set forth in the embodiment of FIG. 11 or indirectly coupled using a Stylus Suspension 10. The Stylus Suspension 10 reduces the axial stresses in the Flexible Stylus 9 during axial (normal) contact with a rigid surface. The Dynamic Force Sensor 8 measures the quasi-static load, both normal and tangential, produced when the stylus makes contact. The Dynamic Force Sensor 8 also measures low frequency vibration (typically less than 100 Hz.). This measurement is most important when the stylus is in contact with a test surface. High force levels during a touch event would indicate stylus damage. High dynamic (oscillatory) force levels would indicate either excessive relative vibration between the test part and stylus or excessive vibration of the stylus between touch events.

Figure 2:
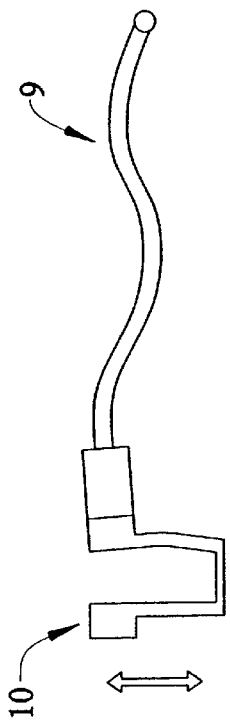
FIG. 2 is an illustration of one high frequency mode shape.

As illustrated in FIG. 2, in order to sensitize the entire length of the stylus, maintain an adequate trigger cycle time to activate the RENISHAW control system and preserve stylus flexibility, a high frequency transverse and/or axial mode of structural vibration for the stylus/suspension is employed. The Flexible Stylus 9 is made of a low modulus of elasticity material with a high yield strength. This permits significant deflection of the stylus without damaging the stylus, i.e. producing a permanent set. Other design considerations for the Flexible Stylus 9 and/or the Stylus 9/Stylus Suspension Unit 10 include minimizing the effects of gravity on stylus orientation and maintaining a sufficiently high principle resonant frequency for the stylus and/or stylus/suspension unit. CMM calibration using specific A/B angles may compensate for stylus deflection due to gravity, however a low stylus frequency with residual vibration amplitudes of 0.0001 inches or greater will effect measurement accuracy.

Figure 3:
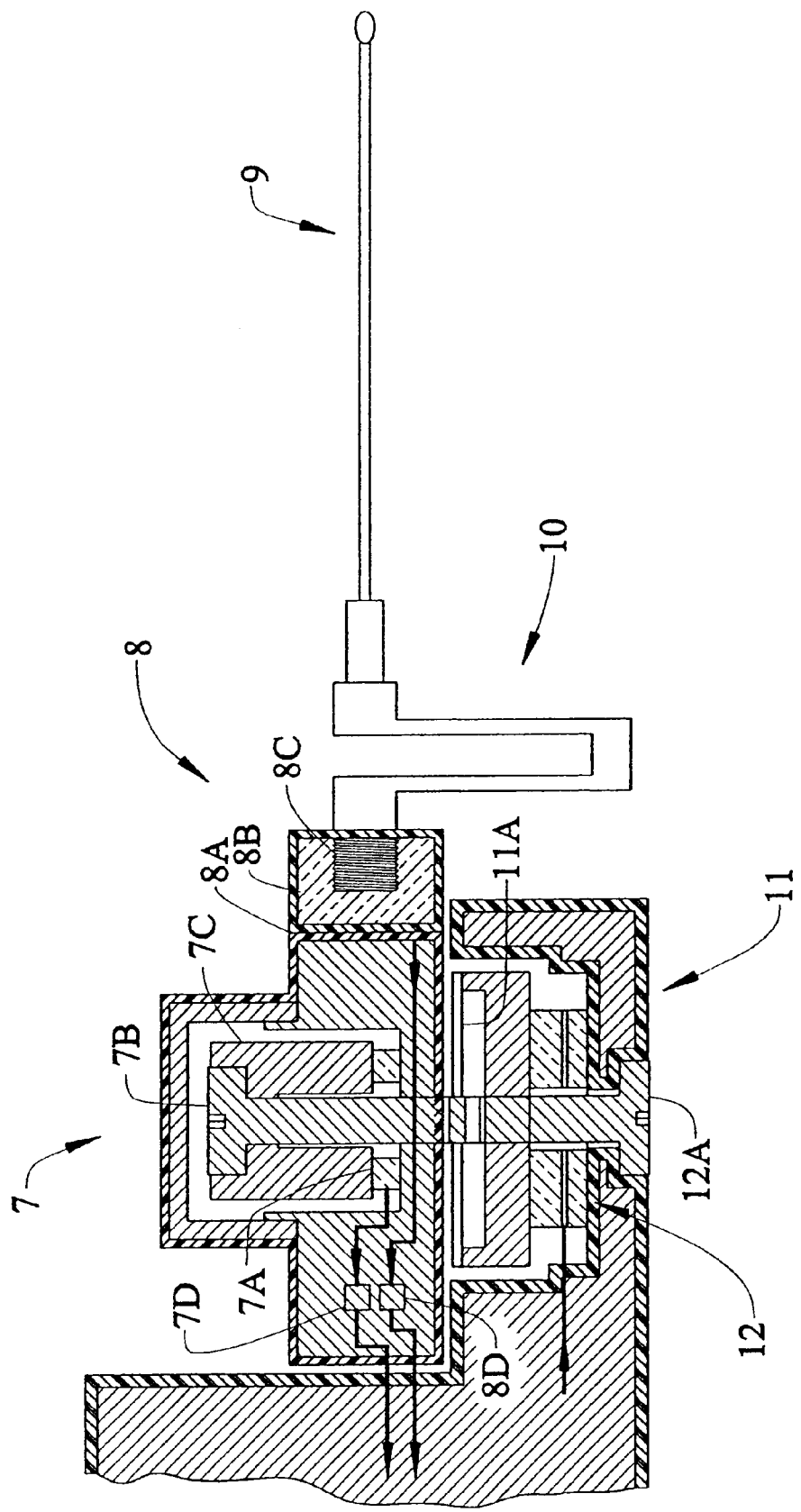
FIG. 3 is a cross-sectional view of the PTP including a compression-mode accelerometer design.
Figure 4:
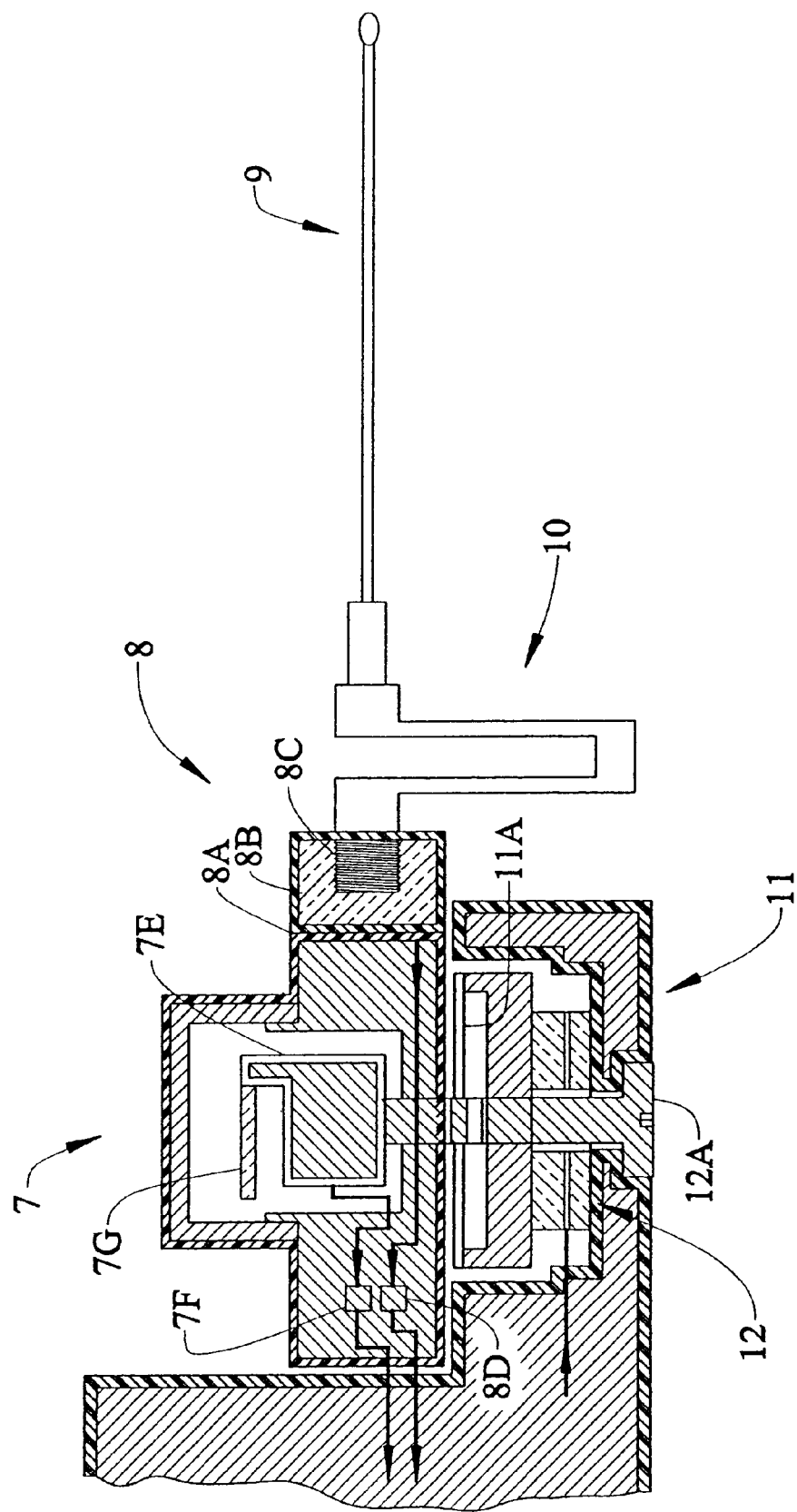
FIG. 4 is a cross-sectional view of the PTP including a beam-mode accelerometer design.
Figure 5:
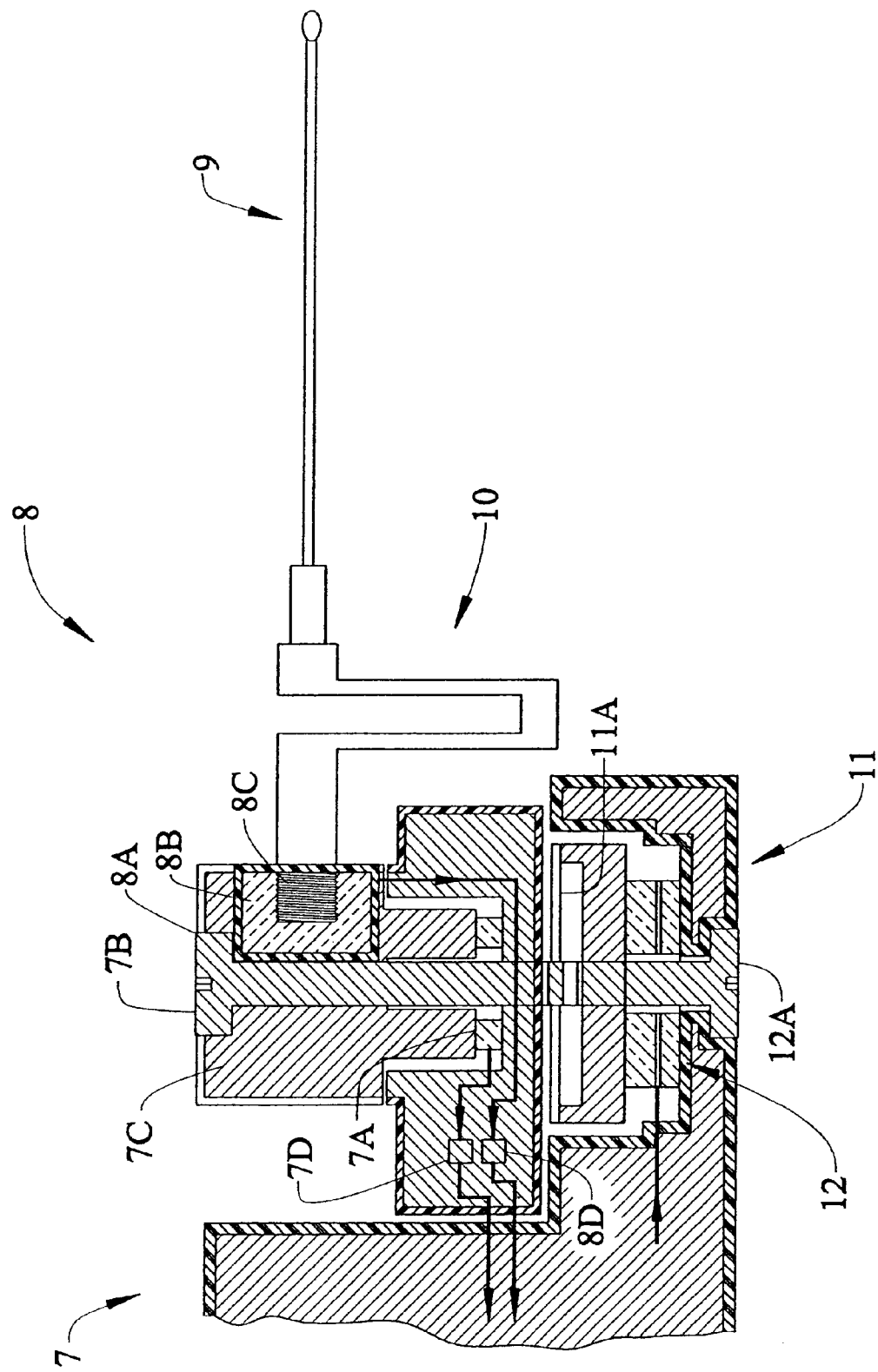
FIG. 5 is a cross-sectional view of the PTP including a seismic mass to convert vibration of the PTP into dynamic force.

Variation in the design of the PTP vibration sensor are disclosed in FIGS. 3, 4 and 5.

In FIG. 3, the vibration sensor is a compression-mode accelerometer design that uses a seismic mass 7c to convert vibration (acceleration) of the stylus 9/suspension 10 into dynamic force. These dynamic forces squeeze the crystals 7a producing a charge output. A stud 7b provides a preload stress to fix the seismic mass 7c to the crystals 7a. The charge signal from the crystals is conditioned and amplified by an electronics package 7d. This electrical vibration signal is measured by the PTP's Data Acquisition and Control Unit 14. The Dynamic force sensor 8 consists of crystals 8b that are preloaded by a stud 8c. The crystals 8b are sandwiched between a rigid plate 8a and the threaded end of either the Stylus Suspension 10 or the Flexible Stylus 9. The charge output from the crystals are conditioned and amplified by an electronics package 8d. Both normal and transverse forces produced when bending the Flexible Stylus 9 and Stylus Suspension 10 are detected and measured by these crystals 8b. Two critical forces are the normal and transverse forces due to axial compression and bending of the Flexible Stylus 9 during operation, and dynamic forces produced by low frequency stylus vibration (typically less than 100 Hz.) of the Flexible Stylus 9 and/or Flexible Stylus/Stylus Suspension 10 that may occur during the touch event or between touch points. Excessive Stylus 9 dynamics will reduce the accuracy of the CMM measurement. The lower section of the PTP houses the Driver Crystals 12 and the Tuned Base 11. The Driver Crystals 12 are preloaded to the Tuned Base 11 using a stud 12a. The Tuned Base mechanically couples the Driver Crystals 12 to the Vibration Sensor 7. The Tuned Base 12 includes a Resonant Structure 11a that amplifies the vibration of the Driver Crystals 12 within the operating frequency band of the Flexible Stylus 9 and/or Flexible Stylus 9/Stylus Suspension unit 10.

In FIG. 4, the vibration sensor uses a beam-mode accelerometer design. In this design, the beam crystal 7g converts vibration (acceleration) of the PTP into a charge output. The beam crystal is coupled to a base 7e that is fixed to the sensor housing and Resonant Structure 11a. The charge signal from the crystals is conditioned and amplified by an electronics package 7f. This electrical vibration signal is measured by the PTP's Data Acquisition and Control Unit 14. In this design, the dynamic force Sensor 8, Flexible Stylus 9, Stylus Suspension 10 and lower section of the PTP including the Tuned Base 11 and Driver Crystals 12 do not change.

In FIG. 5, the vibration sensor uses a seismic mass 7c to convert vibration (acceleration) of the PTP into dynamic force. This design is similar to a compression-mode accelerometer in that the crystals 7a are squeezed by the acceleration of the seismic mass producing a charge output. A stud 7b provides a preload stress to fix the seismic mass 7c to the crystals 7a. The charge signal from the crystals is conditioned and amplified by an electronics package 7d. This electrical vibration signal is measured by the PTP's Data Acquisition and Control Unit 14. This design differs from the compression-mode vibration sensor shown in FIG. 3. In this design, the Dynamic force sensor 8 is mounted into the Seismic Mass 7c. The Dynamic force sensor 8 still consists of crystals 8b that are preloaded by a stud 8c. The crystals 8b are sandwiched between a rigid plate 8a and the threaded end of either the Stylus Suspension 10 or the Flexible Stylus 9. The charge output from the crystals are conditioned and amplified by an electronics package 8d. The Flexible Stylus 9, Stylus Suspension 10 and lower section of the PTP including the Tuned Base 11 and Driver Crystals 12 do not change in this design.

Figure 6:
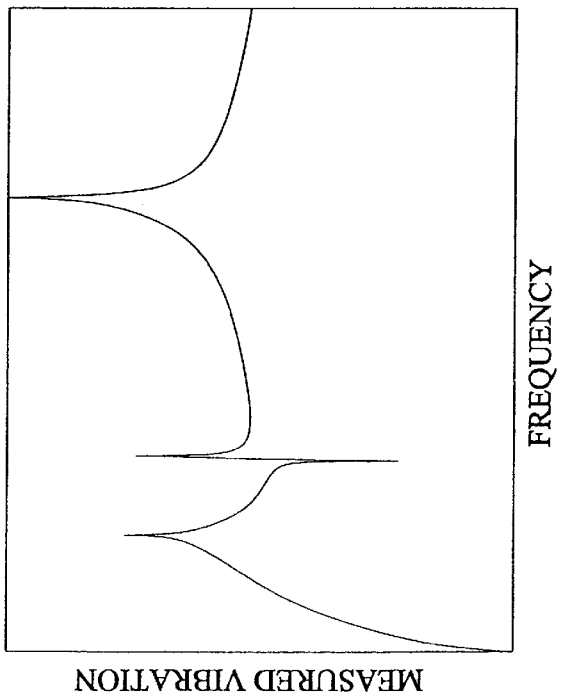
FIG. 6 is a graphical representation of measured vibration versus frequency.
Figure 6A:
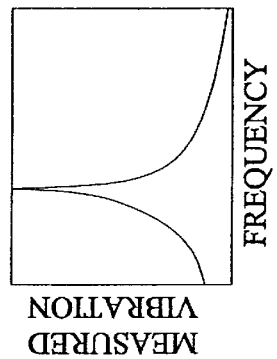
FIG. 6a is a magnified view which more clearly illustrates the contact/no contact detection point shown in FIG. 6.

Now referring to FIG. 6, a graph of measured vibration versus frequency is shown. The PTP detects contact using a change in the vibration characteristics (shift in resonant frequency or attenuation in resonant amplitude of the Flexible Stylus 9 or Flexible Stylus 9/Stylus Suspension 10 unit. This contact/no contact detection is characterized more clearly in the magnified area shown in FIG. 6a.

Figure 7:
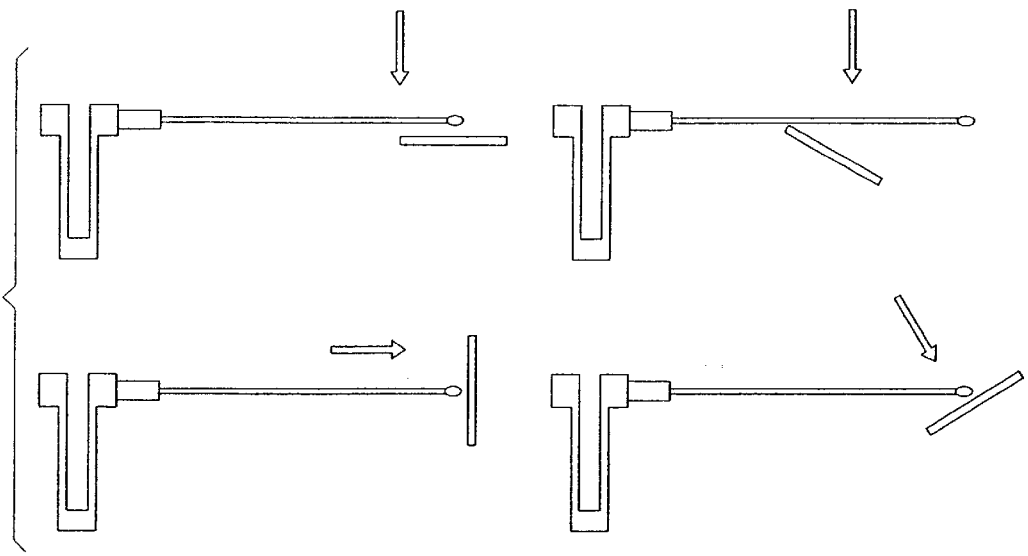
FIG. 7 illustrates typical stylus contact conditions.

FIG. 7 illustrates typical stylus contact conditions. The contact point of the stylus is shown as it encounters a surface perpendicular thereto, parallel thereto, at an angle thereto and a surface which causes shanking of the stylus.

Figure 8:
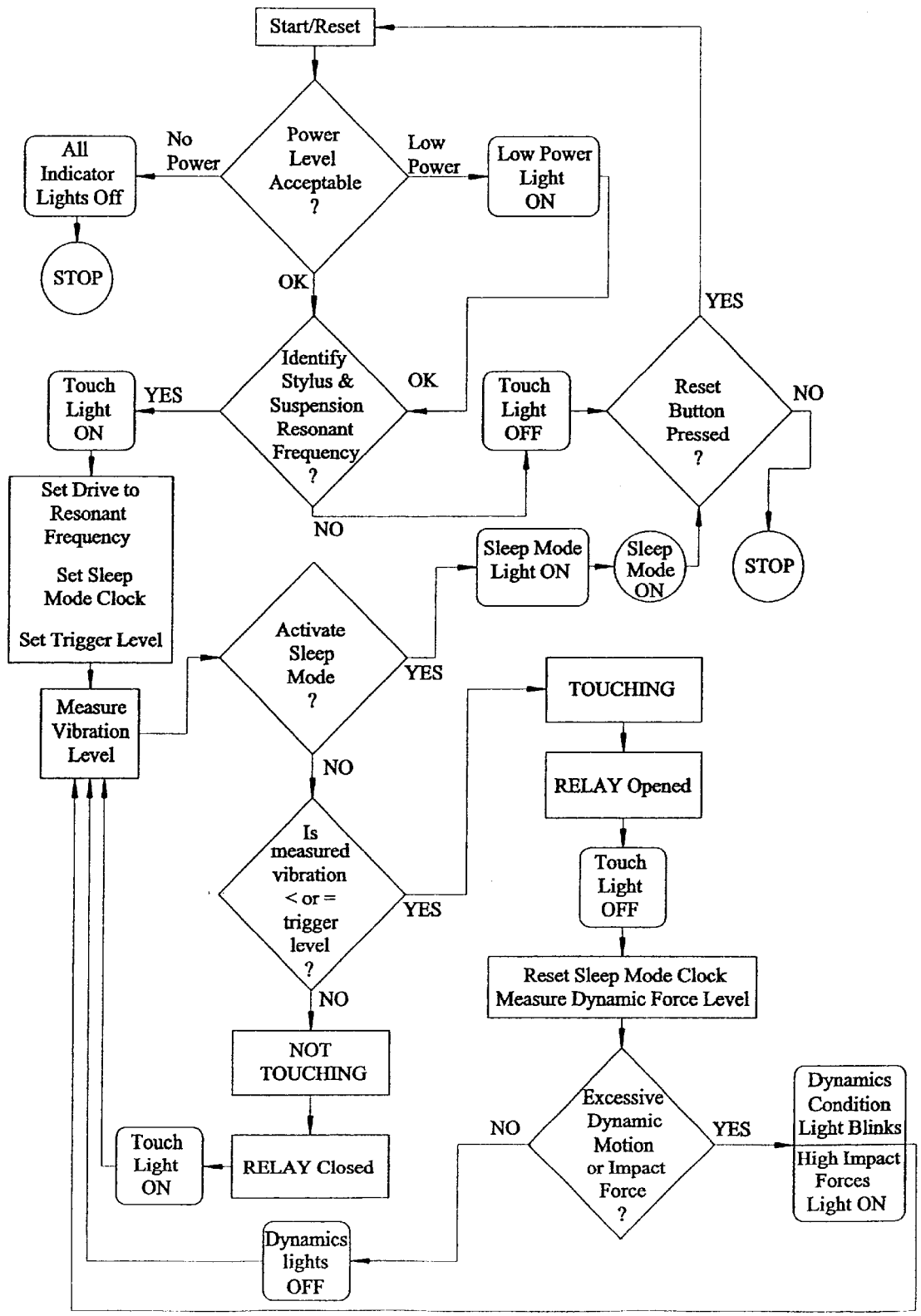
FIG. 8 is a flow chart showing the software algorithm utilized by the Data Acquisition and Control Unit.

FIG. 8 is a flow chart showing the software algorithm utilized by the Data Acquisition and Control Unit 14. The Reset Button 2 is used to calibrate and set the operating parameters for the PTP. The Reset Button is also a start command for the software algorithm used by the Data Acquisition and Control Unit 14 as shown. By pressing the Reset Button 2, the Data Acquisition and Control Unit 14 checks the Power Level. If No Power is available, All Indicator Lights are OFF. If battery power is low, the low power Light is turned ON. If Power Level is acceptable, the system program identifies the Stylus and/or Stylus Suspension Resonant Frequency by conducting a frequency sweep from frequency F1 to frequency F2. Between Driver Frequency F1 and F2, a peak output vibration level measured by the Vibration Sensor 7 is determined both in terms of driver frequency and vibration level at that frequency. If a peak level is not measured between frequency F1 and F2 the Touch Indicator Light is OFF. If a peak level is measured between frequency F1 and F2, the Touch Light is turned ON. The Data Acquisition and Control Unit 14 sets the Drive Frequency to the peak level frequency and establishes a touch trigger level that is a 10% reduction in peak level amplitude. At this time the Sleep Mode Clock is set. The PTP is ready for CMM measurements. The Data Acquisition and Control Unit 14 monitors the time between touch events to determine inactivity and the need to activate the Sleep Mode. A 5 minute period of inactivity will initiate the PTP Sleep Mode. In the Sleep Mode, the Touch Light is OFF. The CMM will not move when the PTP Touch Light is OFF. By pressing the Reset Button 2, the Data Acquisition and Control Unit 14 will recycle.

In operation, the Data Acquisition and Control Unit 14 measures Vibration levels from the Vibration Sensor 7 and compares the vibration levels with the predetermined trigger level. If the measured vibration level is equal to or lower than the trigger level, a touch event is detected and the PTP Relay is opened (High Resistance) to signal the RENISHAW control system that a touch event has occurred. The Touch Light is Turned OFF (This is similar to the RENISHAW Touch Light System). The Sleep Mode Clock is reset and Dynamic Force Level Data measured during the touch event is analyzed by the Data Acquisition and Control Unit 14. If Excessive Dynamic (oscillation) motion including contact force is present, the Dynamics Light is turned ON (Blinking to indicate stylus dynamics and Constant to indicate excessive contact force during the Touch). If excessive dynamic force is not present, the Dynamic light remains OFF. The Data Acquisition and Control Unit 14 then recycles to measure the vibration level.

Figure 9A:
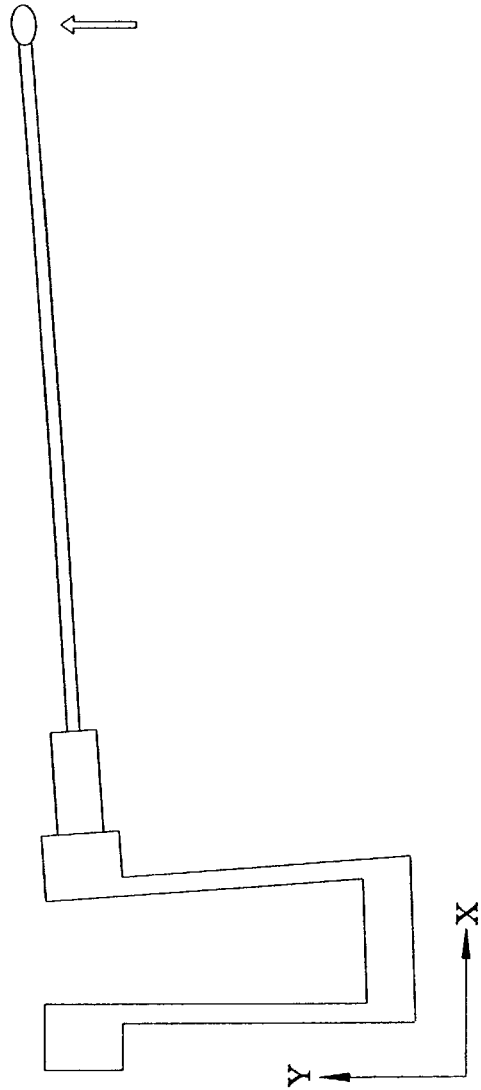
FIG. 9 is a perspective view illustrating "x" and "y" axis deflection of the stylus.
Figure 9B:
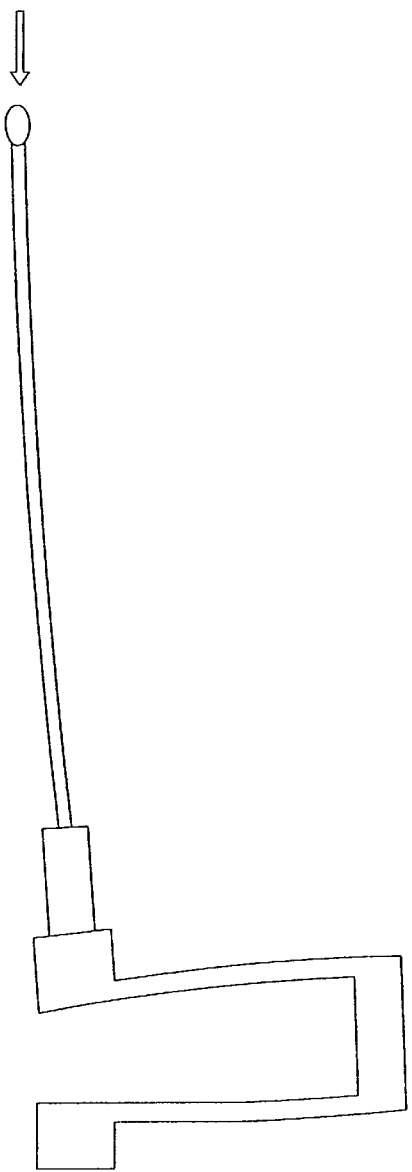

In accordance with the example set forth in FIG. 9, analysis of acceptable stylus designs require calculation of "X" and "Y" deflection problems due to contact.

As shown in FIG. 10, contact in the "x", "y" and "z" axes are sensed by crystals 8b and appropriately reported to Data Acquisition and Control unit 14.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. In combination with a Coordinate Measurement Machine (CMM) useful for the measurement of structure geometry, an improved piezoelectric touch probe comprising:

a control unit securable to a robotic arm of said CMM having a driver to create an acceleration/vibration driver signal; a vibration sensor, having an operating frequency band, electrically coupled to said control unit;

and a flexible and removable stylus coupled to said vibration sensor;

whereby said driver signal causes vibration of said flexible stylus wherein said vibration sensor measures a resonant frequency created by said stylus in relation to structure geometry;

wherein said vibration sensor further includes means to amplify a vibration signal received from said stylus; and, wherein said means to amplify the vibration signal is a suspension of said flexible stylus that is coupled to the dynamically tuned structure.

2. The combination CMM and Piezoelectric Touch Probe according to claim 1 wherein said control unit includes a means for data acquisition.

3. The combination CMM and Piezoelectric Touch Probe according to claim 1 wherein said control unit includes a dynamically tuned structure for amplification of said driver signal.

4. The combination CMM and Piezoelectric Touch Probe according to claim 1 wherein said vibration sensor includes a compression-mode accelerometer that uses a seismic mass.

5. The combination CMM and Piezoelectric Touch Probe according to claim 1 wherein said vibration sensor includes a resonant structure to magnify the resonant characteristics of said stylus characterized by a beam crystal.

6. The combination CMM and Piezoelectric Touch Probe according to claim 4 wherein said vibration sensor further includes crystals for generation of a vibration signal to magnify the resonant frequency characteristics of said stylus.

7. The combination CMM and Piezoelectric Touch Probe according to claim 3 including a means for resonance adjustment of the dynamically tuned structure and resonant accelerometer/vibration sensor to magnify the resonant characteristics of said stylus to detect minute movements in said stylus vibration.

8. The combination CMM and Piezoelectric Touch Probe according to claim 1 wherein said stylus utilizes an axial, transverse or combination of axial and transverse mode of structural vibration that sensitizes the entire stylus shaft to contact.

9. The combination CMM and Piezoelectric Touch Probe according to claim 8 wherein said stylus includes a ruby tip along a distal end of said shaft.

10. The combination CMM and Piezoelectric Touch Probe according to claim 8 wherein said stylus includes a suspension means for increasing sensitivity along the shaft of said stylus.

11. The combination CMM and Piezoelectric Touch Probe according to claim 1 wherein said stylus includes a flexible, low modulus high yield strength ruby tipped shaft having a low stiffness to minimize contact force between said stylus and a structure to be measured.

12. The combination CMM and Piezoelectric Touch Probe according to claim 8 wherein said shaft of said stylus allows a significant deflection without damage thereto.

13. The combination CMM and Piezoelectric Touch Probe according to claim 1 wherein said stylus is defined as a high yield strength ruby tipped shaft whose deflection due to gravity is compensated by CMM calibration software.

14. The combination CMM and Piezoelectric Touch Probe according to claim 13 wherein said stylus operates with high transverse and/or axial resonant frequencies tuned to the operating frequency band of said vibration sensor.

15. The combination CMM and Piezoelectric Touch Probe according to claim 1 wherein said control unit is digital and provides a repeatable sweep of the operating frequency band of the Piezoelectric vibrator using a high resolution sinusoidal signal.

16. The combination CMM and Piezoelectric Touch Probe according to claim 1 including a digital control circuit that automatically sweeps the operating band of a piezoelectric vibrator using a high resolution sinusoidal signal to precisely detect, within 1 Hz, the resonant frequency of the stylus; set the driver signal frequency at the resonant frequency of the stylus; and control the driver signal amplitude.

17. The combination CMM and Piezoelectric Touch Probe according to claim 1 wherein the control unit is manually operated.

18. The combination CMM and Piezoelectric Touch Probe according to claim 1 wherein said control unit includes a low amplitude output warning indicator.

19. A dynamic piezoelectric touch probe comprising:
   (1) a piezoelectric vibrator controlled by a self-tuning drive circuit that adjusts operating frequency and amplitude;
   (2) a high sensitivity, resonant accelerometer unit coupled to the piezoelectric vibrator;
   (3) a flexible stylus/suspension with transverse resonant frequencies tuned to the operating frequency band of the piezoelectric vibrator; and
   (4) a digital control circuit that automatically sweeps the operating band of the piezoelectric vibrator;
   wherein said digital control circuit
   (a) detects the resonant frequency of the stylus/suspension;
   (b) set the drive signal frequency at the resonance of the stylus/suspension; and
   (c) control the drive signal amplitude.

* * * * *